Dec. 16, 1969 NORIO TSUBOUCHI ETAL 3,484,377

PIEZOELECTRIC CERAMIC MATERIAL

Filed Dec. 6, 1967 4 Sheets-Sheet 1

INVENTORS
NORIO TSUBOUCHI
MASAO TAKAHASHI
TOMEJI OHNO
TSUNEO AKASHI

BY Hopgood & Calimafde

ATTORNEYS

INVENTORS
NORIO TSUBOUCHI
MASAO TAKAHASHI
TOMEJI OHNO
TSUNEO AKASHI
BY Hopgood & Calimafde
ATTORNEYS INVENTORS
NORIO TSUBOUCHI
MASAO TAKAHASHI
BY TOMEJI OHNO
TSUNEO AKASHI
Hopgood & Calimafde
ATTORNEYS

INVENTORS
NORIO TSUBOUCHI
MASAO TAKAHASHI
BY TOMEJI OHNO
TSUNEO AKASHI

Hopgood & Calimafde
ATTORNEYS

United States Patent Office 3,484,377

Patented Dec. 16, 1969

3,484,377

PIEZOELECTRIC CERAMIC MATERIAL

Norio Tsubouchi, Masao Takahashi, Tomeji Ohno, and Tsuneo Akashi, Tokyo-to, Japan, assignors to Nippon Electric Company, Limited, Tokyo, Japan Filed Dec. 6, 1967, Ser. No. 688,446

Claims priority, application Japan, Dec. 8, 1966, 41/80,568, 42/66,779; Apr. 20, 1967, 42/25,272; 42/66,778

Int. Cl. C04b *35/28*

U.S. Cl. 252—62.9 3 Claims

ABSTRACT OF THE DISCLOSURE

A piezoelectric ceramic material is provided consisting essentially of a solid solution of the three components $Pb(Mn_{1/2}Z_{1/2})O_3$, $PbTiO_3$ and $PbZrO_3$, wherein Z represents one element selected from the group consisting of Nb and Sb.

Figure 1:
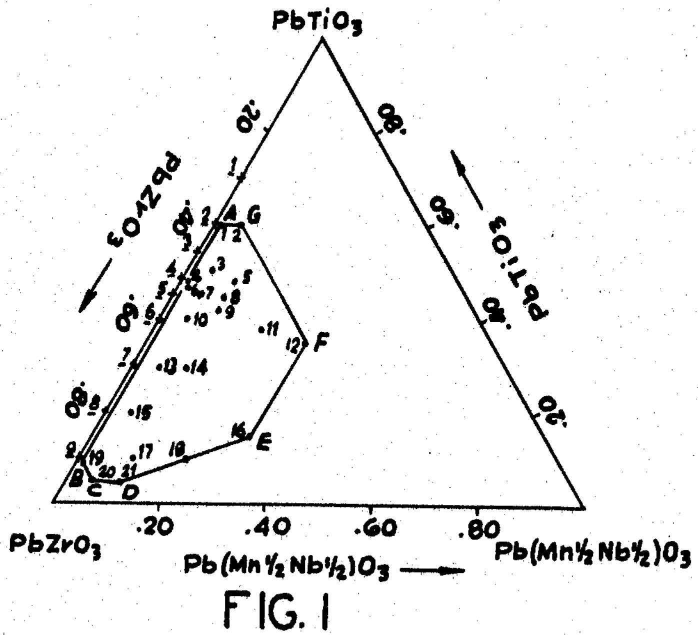

This invention relates to piezoelectric materials and more particularly to novel piezoelectric ceramics having excellent piezoelectric properties.

Fundamental measures for evaluating in practice the piezoelectric properties of a piezoelectric material are the electromechanical coupling factor and the mechanical quality factor. The former is a representative of the efficency of transforming the electric oscillation into mechanical vibration and of conversely transforming the mechanical vibration into electrical oscillation. Greater electromechanical coupling factor stands for better efficiency of interconversion. The latter shows the reciprocal proportion of the energy consumed by the material during the energy conversion, larger mechanical quality factor accounting for smaller energy consumption.

One of the typical fields of application of piezoelectric materials is manufactured of the elements of ceramic filters. In this case, it is necessary to furnish the electromechanical coupling factor with an optimum value selected from a wide range between an extremely great value and a very small value and it is desirable for the mechanical quality factor to assume as large a value as possible. This fact is fully described in, for example R. C. V. Macario, "Design Data for Band-Pass Ladder Filter Employing Ceramic Resonators" which appears in Electronic Engineering, vol. 33, No. 3 (1961) pp. 171–177.

The transducer elements of mechanical filters provide another important field of application of piezoelectric ceramics. In this case, both the electromechanical coupling factor and the mechanical quality factor should be as large as possible.

It has been often true, however, that conventional piezoelectric ceramics, for example, barium titanate ($BaTiO_3$) and lead titanate zirconate [$Pb(Ti{\cdot}Zr)O_3$] have the electromechanical coupling factor and the mechanical quality factor one or both of which is of extremely small value and hence they are unfit for the practical use. In particular, the mechanical quality factor has often been so small as to make the practical use of the ceramics impossible. Attempts have been made to improve these factors by incorporating various additional constituents into the ceramics such as lead titanate zirconate ceramics but in most cases have resulted in improvement of only one of electromechanical coupling factor and mechanical quality factor. Thus, these two factors have not remarkably improved simultaneously.

The object of this invention is to provide a novel piezoelectric ceramic material having large values of both the electromechanical coupling factor and mechanical quality factor.

The other object of this invention is to provide a novel piezoelectric ceramic material suited for use in various fields such as manufacture of the elements of ceramic filters and the transducer elements of mechanical filters.

This invention is based on the new discovery that the ceramic compositions consisting esentially of a solid solution of $Pb(Mn_{1/2}Z_{1/2})O_3$-$PbTiO_3$-$PbZrO_3$ ternary system, where Z represents one element selected from Nb and Sb, show the excellent piezoelectric properties and hence have the practical utility.

The above ceramic compositions contain lead (Pb) as a divalent metallic element and also titanium (Ti) and zirconium (Zr) as tetravalent metallic elements. Moreover, the element manganese (Mn) and one element selected from niobium (Nb) and antimony (Sb) are contained in such a proportion that they may be, as a whole, substantially equivalent to a tetravalent metallic element.

In case that niobium (Nb) is selected for Z and that the ceramic material of the $$Pb(Mn_{1/2}Nb_{1/2})O_3\text{-}PbTiO_3\text{-}PbZrO_3$$

ternary system is represented by the compositional formula $$[Pb(Mn_{1/2}Nb_{1/2})O_3]_x[PbTiO_3]_y[PbZrO_3]_z$$

where *x*, *y* or *z* is the mol ratio of each component and $x+y+z=1.00$, it has been found that the compositions should be restricted in view of their effective properties within the range determined by the following combination of the mol ratios *x*, *y* and *z*:

| x | y | z |
|---|---|---|
| 0.01 | 0.60 | 0.39 |
| 0.01 | 0.09 | 0.90 |
| 0.05 | 0.05 | 0.90 |
| 0.10 | 0.05 | 0.85 |
| 0.30 | 0.15 | 0.55 |
| 0.30 | 0.35 | 0.35 |
| 0.05 | 0.60 | 0.35 |

Also, when antimony (Sb) is selected for Z, the effective range of the ceramic composition given by the formula $$[Pb(Mn_{1/2}Sb_{1/2})O_3]_x[PbTiO_3]_y[PbZrO_3]_z$$

where $$x+y+z=1.00$$

is decided by the following combination of the mol ratios *x*, *y* and *z*:

| x | y | z |
|---|---|---|
| 0.01 | 0.55 | 0.44 |
| 0.01 | 0.09 | 0.90 |
| 0.05 | 0.05 | 0.90 |
| 0.20 | 0.05 | 0.75 |
| 0.20 | 0.40 | 0.40 |
| 0.05 | 0.55 | 0.40 |

Among the conventional piezoelectric ceramics, known is a ceramic solid solution of the $$Pb(Mg_{1/3}Nb_{2/3})O_3\text{-}PbTiO_3\text{-}PbZrO_3$$

ternary system, which is disclosed in the United States Patent 3,268,453 granted Aug. 23, 1966 to H. Ouchi et al. This conventional ceramic material, however, does not improve by itself the piezoelectric properties of the previous $PbTiO_3$-$PbZrO_3$ ceramics, and an excellent piezoelectric ceramic material is obtained only by adding thereto at least one of oxides of manganese, cobalt, nickel, iron and chromium as additional constituents up to 3 weight percent. In contrast, the $Pb(Mn_{1/2}Z_{1/2})O_3$-$PbTiO_3$-$PbZrO_3$ compositions of this invention, where Z represent Nb or Sb, remarkably improve the piezoelectric properties by itself (i.e. without any additional constituent). This difference in improvement of piezoelectric properties between the conventional compositions and the novel compositions of this invention is, it is believed, due to the fact that the conventional compositions use in the basic composition magnesium (Mg), an element belonging to the Group II–A in the periodic table, in conjunction with a Group V–B element niobium (Nb), while in the compositions of this invention a Group VII–B element manganese (Mn) is used in conjunction with a Group V–B or V–A element niobium (Nb) or antimony (Sb).

Excellent piezoelectric properties of the ceramic compositions of this invention will be apparent from the following more particular description of preferred examples of this invention, as illustrated in the accompanying drawings.

Figure 3:
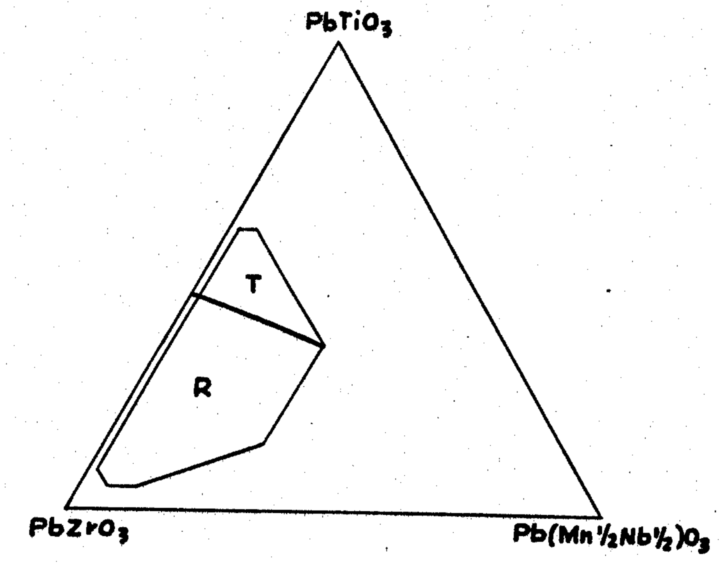
Figure 2A:
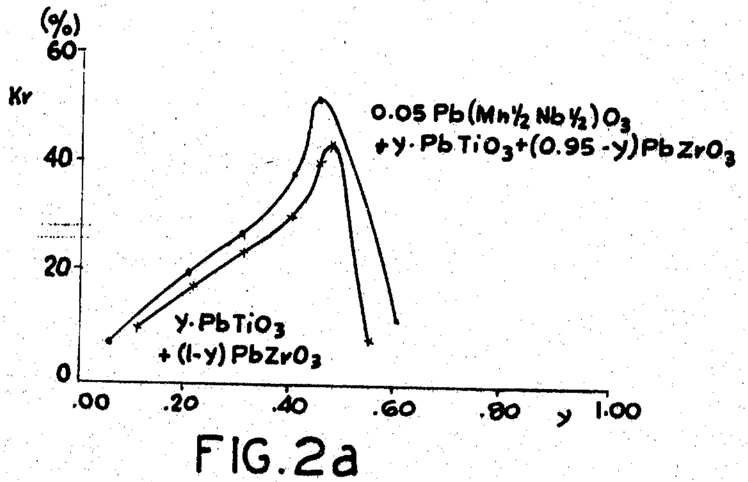
Figure 2B:
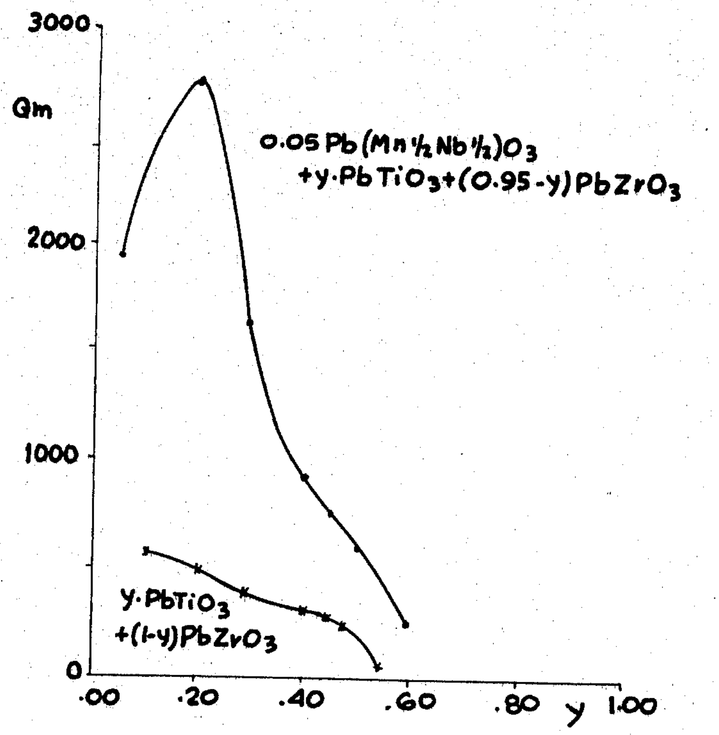
Figure 4:
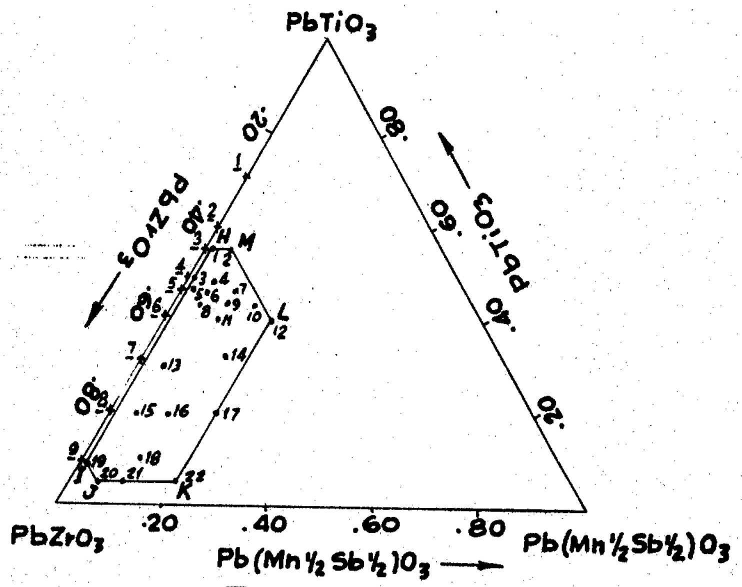
Figure 6:
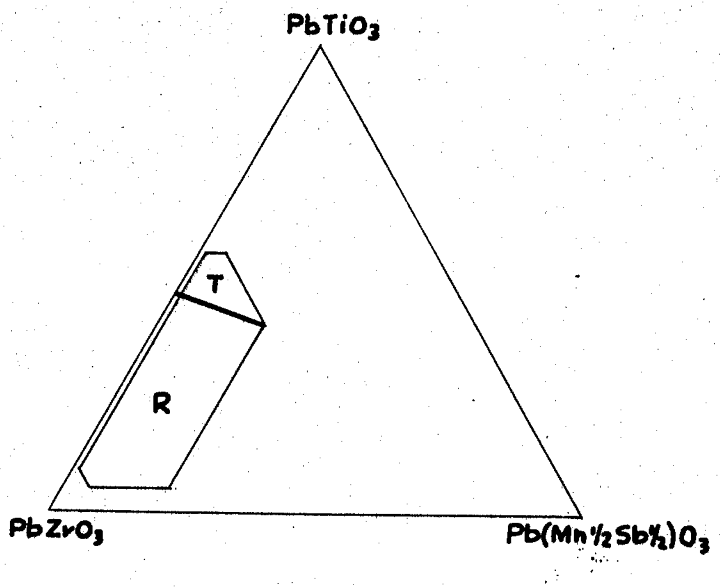

In the drawings:

FIGS. 1 and 4 are the triangular compositional diagrams of the ternary system showing both the effective ranges of the compositions of this invention and the specific compositions of the examples;

FIGS. 2(*a*)(*b*) and 5(*a*)(*b*) are graphs showing the electromechanical coupling factors [(*a*)] and the mechanical quality factors [(*b*)] of both the conventional lead titanate zirconate ceramics and the ceramics of this invention, as a function of compositional change of lead titanate and lead zirconate in both the ceramics; and FIGS. 3 and 6 are the phase diagrams of the ternary system of this invention; while FIGS. 1, 2 and 3 are for the novel ternary system $$Pb(Mn_{1/2}Nb_{1/2})O_3\text{-}PbTiO_3\text{-}PbZrO_3$$

among the ceramic compositions of this invention; and

Figure 5A:
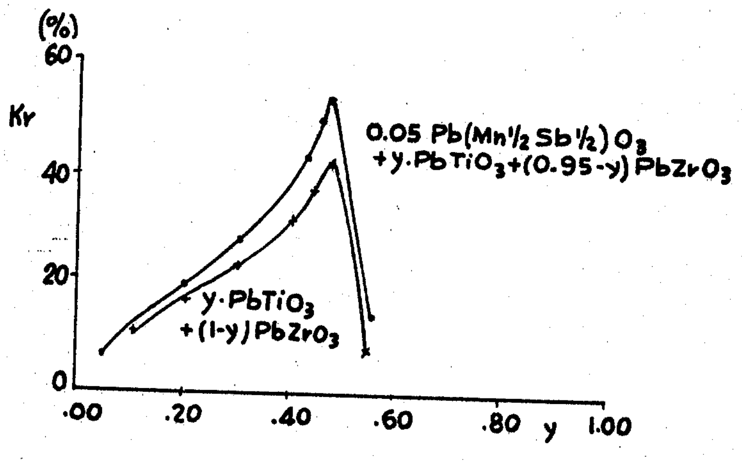
Figure 5B:
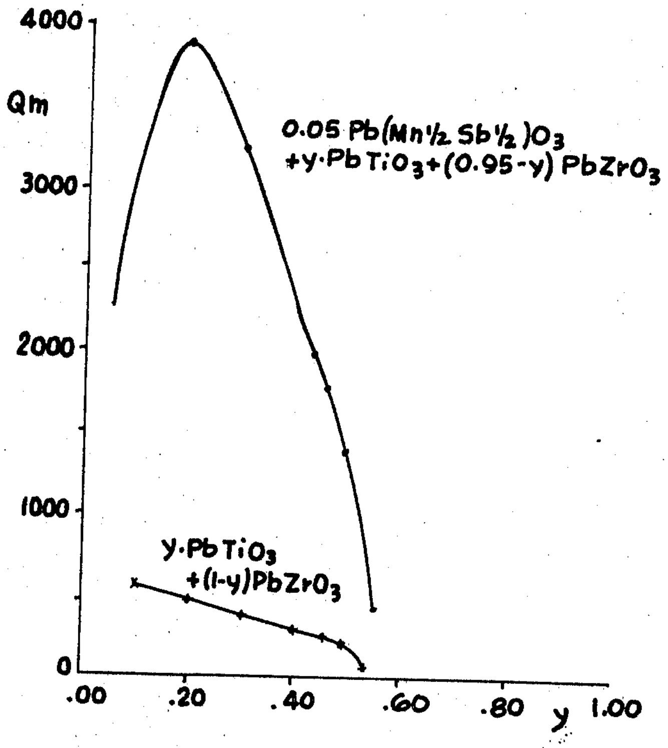

FIGS. 4, 5 and 6 are for the novel ternary system $Pb(Mn_{1/2}Sb_{1/2})O_3\text{-}PbTiO_3\text{-}PbZrO_3$ among the ceramic compositions of this invention.

EXAMPLES

Powdered materials of lead monoxide (PbO), manganese carbonate ($MnCO_3$), niobium pentoxide ($Nb_2O_5$), titanium dioxide ($TiO_2$), and zirconium dioxide ($ZrO_2$) were used as starting materials to obtain the $$Pb(Mn_{1/2}Nb_{1/2})O_3\text{-}PbTiO_3\text{-}PbZrO_3$$

ceramics of this invention, unless otherwise remarked. These powdered materials were so weighed that the final specimens may have the compositional proportions shown in Table 1. Also, powdered materials of lead monoxide (PbO), manganese carbonate ($MnCO_3$), antimony sesquioxide, ($Sb_2O_3$), titanium dioxide ($TiO_2$), and zirconium dioxide ($ZrO_2$) were used as starting materials to obtain the $Pb(Mn_{1/2}Sb_{1/2})O_3\text{-}PbTiO_3\text{-}PbZrO_3$ ceramics of this invention, unless otherwise remarked. These powders were also weighed in such a manner that the final specimens may have the compositional proportions shown in Table 2. Here, manganese carbonate ($MnCO_3$) and antimony sesquioxide ($Sb_2O_3$) were weighed as calculated on the basis of manganese sesquioxide ($Mn_2O_3$) and antimony pentoxide ($Sb_2O_5$), respectively. In addition, the powder of lead monoxide, titanium dioxide and zirconium dioxide were weighed to obtain the conventional lead titanate zirconate ceramics having the compositional proportions shown in Table 3.

The respective powders were mixed in a ball mill with distilled water. The mixed powders were subjected to filtration, dried, crushed, then presintered at 900° C. for one hour, and again crushed. Thereafter, the mixtures, with a small amount of distilled water being added thereto, were press-molded into discs of 20 mm. in diameter at a pressure of 700 kg./cm.$^2$ and sintered in an atmosphere of lead monoxide (PbO) for one hour at a temperature of 1300° C. for the specimens containing up to 5 mol percent of $Pb(Mn_{1/2}Z_{1/2})O_3$ (Z represents Nb or Sb), of 1260° C. for those containing up to 10 mol percent of the same component, or of 1230° C. for those containing more than 10 mol percent of the same component. The resulting ceramic discs were polished on both surfaces to the thickness of one millimeter, provided with silver electrodes on both surfaces, and thereafter piezoelectrically activated through the polarization treatment at 100° C. for one hour under an applied D.-C. electric field of 50 kv./cm. for the specimens containing up to 5 mol percent of $Pb(Mn_{1/2}Z_{1/2})O_3$ (Z is Nb or Sb), of 40 kv./cm. for those containing up to 10 mol percent of the same component, or of 30 kv./cm. for those containing more than 10 mol percent of the same component.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $k_r$ was calculated by the resonant to antiresonant frequency method. The dielectric constant ($\epsilon$) and the dielectric loss (tan $\delta$) were also measured at a frequency of 1 kHz.

Tables 1, 2 and 3 show typical results obtained. In the tables, the specimens are arranged according to the $PbTiO_3$ content thereof and there are also listed several values of Curie temperature which was determined through measurement of temperature variation in the dielectric constant ($\epsilon$). The novel compositions of the specimens of Tables 1 and 2 are shown with black points in FIGS. 1 and 4, respectively, while the conventional compositions of the specimens of Table 3 are indicated by crosses in the same figures.

The results for the specimens Nos. 6 and 7 of Table 1 and Nos. 4 and 6 of Table 2 representatively shows that the ceramics of this invention have extremely large values of both $k_r$ and $Q_m$. In the specimens No. 15 of Table 1 and Nos. 13 and 15 of Table 2, increase in the $Q_m$ value is particularly remarked. Comparison of these results with those for the specimens Nos. 4 and 9 of Table 3 will reveal that the greatest $k_r$ and $Q_m$ values of the novel ceramics of this invention are far superior to the maximum $k_r$ and $Q_m$ values of the conventional lead titanate zirconate ceramics which have been known as the most excellent piezoelectric ceramic material. Moreover, comparison of the results in Table 1 or 2 with those in Table 3, particularly between the novel and conventional ceramics in which the ratios of the $PbTiO_3$ content and the $PbZrO_3$ content are similar to each other, will also indicate that both $k_r$ and $Q_m$ are remarkably improved in the ceramics of this invention. This latter fact will be more clearly understood from FIG. 2(*a*)(*b*) or FIG. 5(*a*)(*b*), wherein the curves of a thick line represent the $k_r$ values [(*a*)] and the $Q_m$ values [(*b*)] of a novel ceramic material containing 5 mol percent of $$Pb(Mn_{1/2}Nb_{1/2})O_3 \text{ [FIG. 2]}$$

or $Pb(Mn_{1/2}Sb_{1/2})O_3$ (FIG. 5], the varing amount $y$ of $PbTiO_3$ and the remaining amount of $PbZrO_3$, while the curves of a fine line show the $k_r$ values [(*a*)] and the $Q_m$ values [(*b*)] of a conventional lead titanate zirconate ceramic material with the varying amount $y$ of $PbTiO_3$.

As is seen from the above, this invention provides the excellent, usefull piezoelectric ceramics having the quite large values of both $k_r$ and $Q_m$.

In the novel ceramics of $$Pb(Mn_{1/2}Z_{1/2})O_3\text{-}PbTiO_3\text{-}PbZrO_3$$

ternary system (Z is Nb or Sb) of this invention, the superior piezoelectric properties as mentioned above are available only when the composition represented by the formula $[Pb(Mn_{1/2}Z_{1/2})O_3]_x[PbTiO_3]_y[PbZrO_3]_z$, where $x$, $y$ and $z$ represent a set of mol ratios and $$x+y+z=1.00$$

and where Z represents one element selected from Nb and Sb, falls within the area A-B-C-D-E-F-G of FIG. 1 of the drawing in case Nb is selected for Z and within the area H-I-J-K-L-M of FIG. 4 of the drawing in case Sb is selected for Z. The sets of mol ratios of the vertices of each area are as follows:

| | x | y | z |
|---|---|---|---|
| A | 0.01 | 0.60 | 0.39 |
| B | 0.01 | 0.09 | 0.90 |
| C | 0.05 | 0.05 | 0.90 |
| D | 0.10 | 0.05 | 0.85 |
| E | 0.30 | 0.15 | 0.55 |
| F | 0.30 | 0.35 | 0.35 |
| G | 0.05 | 0.60 | 0.35 |
| H | 0.01 | 0.55 | 0.44 |
| I | 0.01 | 0.09 | 0.90 |
| J | 0.05 | 0.05 | 0.90 |
| K | 0.20 | 0.05 | 0.75 |
| L | 0.20 | 0.40 | 0.40 |
| M | 0.05 | 0.55 | 0.40 |

In case the $Pb(Mn_{1/2}Nb_{1/2})O_3$ content or $$Pb(Mn_{1/2}Sb_{1/2})O_3$$

content of the ternary system ceramic material is less than that falling within the above-mentioned area, it becomes impossible to complete the sintering in manufacture of the ceramics and besides the piezoelectric properties of the ceramics obtained are inferior to or nearly equal to those of the conventional lead titanate zirconate ceramics or otherwise, even if improved, insufficient for practical use. If the $Pb(Mn_{1/2}Z_{1/2})O_3$ content (Z is Nb or Sb) is more than that falling within the above-mentioned area, accomplishment of the sintering is very difficult and the ceramics obtained have not practicable piezoelectric properties. Where the $PbTiO_3$ content is outside the above-mentioned area, the piezoelectric properties of the ceramics so deteriorate as to make the practical use impossible. Finally, in case the $PbZrO_3$ content is less than the effective content falling within the above-mentioned area, it follows that completion of the sintering becomes difficult, that the polarization treatment is not perfectly carried out and that a useful piezoelectric ceramic material is not obtainable. While, the $PbZrO_3$ content more than the effective content results an unuseful piezoelectric ceramic material having markedly inferior piezoelectric properties.

In view of the above, it is determined that the ceramics of this invention, if required to apply to a practical use, should have the compositions falling within any of the areas specified above. The ceramics of the effective compositions show excellent piezoelectric properties and have a high Curie temperature, as shown in Tables 1 and 2, so that the piezoelectric activities may not be lost up to elevated temperature.

The ternary system of $Pb(Mn_{1/2}Nb_{1/2})O_3$ or $$Pb(Mn_{1/2}Sb_{1/2})O_3$$

$PbTiO_3$, and $PbZrO_3$ of this invention exists in a solid solution in greater parts of compositions and such a solid solution has a perovskite-type crystalline structure. FIGS. 3 and 6 show the crystalline phases of the ceramic compositions falling within the areas A-B-C-D-E-F-G of FIG. 1 and H-I-J-K-L-M of FIG. 4, respectively, as determined at room temperature by the powder method of X-ray analysis. These compositions have a perovskite-type crystalline structure and belong to either the tetragonal phase (indicated by T in the figures) or the rhombohedral phase (indicated by R). The morphotrophic phase is shown with a thick line in each figure. In general $k_r$ is extremely great in the vicinity of this phase boundary, while $Q_m$ is extremely large in the rhombohedral phase.

It will be apparent that the starting materials to be used in manufacture of the ceramics of this invention are not limited to those used in the above examples. In detail, those oxides which are easily decomposed at elevated temperature to form required compositions may be used instead of any starting material of the above examples, as exemplified by $Pb_3O_4$ for PbO and by $MnO_2$ for $MnCO_3$ in the examples. Also, those salts such as oxalates or carbonates may be used instead of the oxides used in the examples, which are easily decomposed into the respective oxides at elevated temperature. Otherwise, hydroxides of the same character as above, such as $Nb(OH)_5$, may be used instead of the oxides such as $Nb_2O_5$. Moreover, an excellent piezoelectric ceramic material having similar properties to the above examples is still also obtainable by preparing separately the powdered material of each of $Pb(Mn_{1/2}Nb_{1/2})O_3$ or $$Pb(Mn_{1/2}Sb_{1/2})O_3$$

$PbTiO_3$ and $PbZrO_3$ in advance and by using them as starting materials to be mixed subsequently.

It is usual that niobium pentoxide ($Nb_2O_5$) and zirconium dioxide ($ZrO_2$) which are available in the market contain, respectively, several percent of tantalum pentoxide ($Ta_2O_5$) and hafnium dioxide ($HfO_2$). Accordingly, the ceramic compositions of this invention are allowed to contain small amounts of such oxides or elements as existing in the materials available in the market. Moreover, it is presumable that addition of a small amount of some additional constituent to the ceramic compositions of this invention may further improve the piezoelectric properties, from the similar fact recognized in the conventional lead titanate zirconate ceramics. It will be understood from the foregoing that the ceramic composition of this invention may include appropriate additives.

TABLE 1

| No. | Mol ratio of composition: $Pb(Mn_{1/2}Nb_{1/2})O_3$ x | $PbTiO_3$ y | $PbZrO_3$ z | $k_r$ (percent) | $Q_m$ | ε | tan δ (percent) | Curie temperature (° C.) |
|---|---|---|---|---|---|---|---|---|
| 1 | 0.01 | 0.60 | 0.39 | 10 | 250 | 340 | 1.3 | ---------- |
| 2 | 0.05 | 0.60 | 0.35 | 12 | 207 | 260 | 2.6 | ---------- |
| 3* | 0.05 | 0.50 | 0.45 | 44 | 560 | 490 | 3.2 | ---------- |
| 4 | 0.01 | 0.48 | 0.51 | 48 | 180 | 1,130 | 1.5 | ---------- |
| 5 | 0.10 | 0.48 | 0.42 | 28 | 280 | 1,390 | 3.1 | ---------- |
| 6 | 0.02 | 0.47 | 0.51 | 59 | 500 | 1,090 | 1.5 | 370 |
| 7 | 0.05 | 0.455 | 0.495 | 53 | 730 | 470 | 1.6 | 350 |
| 8* | 0.10 | 0.45 | 0.45 | 37 | 360 | 500 | 3.2 | ---------- |
| 9** | 0.10 | 0.43 | 0.47 | 44 | 400 | 400 | 3.5 | 325 |
| 10 | 0.05 | 0.40 | 0.55 | 37 | 920 | 380 | 1.6 | ---------- |
| 11 | 0.20 | 0.38 | 0.42 | 27 | 260 | 420 | 3.8 | 270 |
| 12 | 0.30 | 0.35 | 0.35 | 23 | 300 | 390 | 9.5 | ---------- |
| 13** | 0.05 | 0.30 | 0.65 | 26 | 1,570 | 260 | 1.6 | ---------- |
| 14 | 0.10 | 0.30 | 0.60 | 17 | 1,640 | 370 | 3.5 | ---------- |
| 15 | 0.05 | 0.20 | 0.75 | 19 | 2,750 | 190 | 1.4 | ---------- |
| 16 | 0.30 | 0.15 | 0.55 | 8 | 360 | 240 | 8.3 | ---------- |
| 17 | 0.10 | 0.10 | 0.80 | 11 | 1,370 | 180 | 4.4 | ---------- |
| 18 | 0.20 | 0.10 | 0.70 | 14 | 1,730 | 260 | 2.0 | ---------- |
| 19 | 0.01 | 0.09 | 0.90 | 14 | 2,010 | 180 | 1.1 | ---------- |
| 20 | 0.05 | 0.05 | 0.90 | 7 | 1,900 | 160 | 1.8 | ---------- |
| 21 | 0.10 | 0.05 | 0.85 | 5 | 1,310 | 170 | 4.4 | ---------- |

TABLE 2

| No. | Mol ratio of composition: Pb(Mn½Sb½)O₃ x | PbTiO₃ y | PbZrO₃ z | $k_r$ (percent) | $Q_m$ | ε | tan δ (percent) | Curie temperature (° C.) |
|---|---|---|---|---|---|---|---|---|
| 1 | 0.01 | 0.55 | 0.44 | 21 | 190 | 240 | 1.4 | ---------- |
| 2 | 0.05 | 0.55 | 0.40 | 15 | 460 | 460 | 1.2 | ---------- |
| 3 | 0.01 | 0.48 | 0.51 | 48 | 165 | 1,195 | 1.4 | ---------- |
| 4* | 0.05 | 0.48 | 0.47 | 55 | 1,380 | 1,170 | 1.3 | ---------- |
| 5 | 0.02 | 0.47 | 0.51 | 56 | 400 | 900 | 1.3 | 355 |
| 6 | 0.05 | 0.46 | 0.49 | 53 | 1,780 | 440 | 1.3 | 320 |
| 7 | 0.10 | 0.46 | 0.44 | 28 | 200 | 690 | 4.6 | ---------- |
| 8** | 0.05 | 0.43 | 0.52 | 43 | 1,930 | 400 | 1.2 | 300 |
| 9* | 0.10 | 0.43 | 0.47 | 39 | 260 | 510 | 4.0 | ---------- |
| 10 | 0.15 | 0.43 | 0.42 | 29 | 130 | 930 | 4.5 | ---------- |
| 11 | 0.10 | 0.40 | 0.50 | 36 | 285 | 460 | 4.1 | ---------- |
| 12 | 0.20 | 0.40 | 0.40 | 22 | 110 | 1,470 | 4.3 | ---------- |
| 13** | 0.05 | 0.30 | 0.65 | 27 | 3,260 | 360 | 1.9 | ---------- |
| 14 | 0.15 | 0.30 | 0.55 | 22 | 230 | 595 | 7.8 | ---------- |
| 15 | 0.05 | 0.20 | 0.75 | 19 | 3,890 | 220 | 2.1 | ---------- |
| 16 | 0.10 | 0.20 | 0.70 | 14 | 390 | 440 | 5.6 | ---------- |
| 17 | 0.20 | 0.20 | 0.60 | 12 | 170 | 1,380 | 8.5 | ---------- |
| 18 | 0.10 | 0.10 | 0.80 | 10 | 590 | 330 | 7.2 | ---------- |
| 19 | 0.01 | 0.09 | 0.90 | 14 | 2,840 | 180 | 1.6 | ---------- |
| 20 | 0.05 | 0.05 | 0.90 | 6 | 2,270 | 205 | 2.4 | ---------- |
| 21 | 0.10 | 0.05 | 0.85 | 4 | 1,270 | 310 | 11.4 | ---------- |
| 22 | 0.20 | 0.05 | 0.75 | 4 | 730 | 330 | 12.6 | ---------- |

NOTE.—In manufacture of the specimens of numbers with a sole asterisk in Tables 1 and 2, triplumbic tetroxide ($Pb_3O_4$) was used instead of lead monoxide (PbO) as one of the starting materials.

Also, for the specimens with double asterisks, manganese dioxide ($MnO_2$) was used instead of manganese carbonate ($MnCO_3$).

TABLE 3

| No. | Mol ratio of composition: PbTiO₃ | PbZrO₃ | $k_r$ (Percent) | $Q_m$ | ε | tan δ (Percent) |
|---|---|---|---|---|---|---|
| 1 | 0.70 | 0.30 | ---------- | ---------- | 340 | 5.7 |
| 2 | 0.60 | 0.40 | ---------- | ---------- | 300 | 2.4 |
| 3 | 0.55 | 0.45 | 8 | 30 | 350 | 1.3 |
| 4 | 0.48 | 0.52 | 42 | 250 | 1,060 | 1.6 |
| 5 | 0.45 | 0.55 | 38 | 290 | 640 | 3.0 |
| 6 | 0.40 | 0.60 | 30 | 320 | 460 | 3.1 |
| 7 | 0.30 | 0.70 | 24 | 380 | 380 | 3.3 |
| 8 | 0.20 | 0.80 | 15 | 470 | 350 | 3.3 |
| 9 | 0.10 | 0.90 | 10 | 580 | 280 | 3.4 |

NOTE.—For the specimens Nos. 1 and 2, the evaluation of piezoelectric activities was impossible.

What is claimed is:

1. A piezoelectric ceramic material consisting essentially of the composition which is represented by the formula $$[Pb(Mn_{1/2}Z_{1/2})O_3]_x[PbTiO_3]_y[PbZrO_3]_z$$

where $x$, $y$ and $z$ represent a set of mol ratios and $$x+y+z=1.00$$

and where Z represents one element selected from the group consisting of Nb and Sb, and which falls within the area A-B-C-D-E-F-G of FIG. 1 of the drawing when Nb is selected for Z and within the area H-I-J-K-L-M of FIG. 4 of the drawing when Sb is selected for Z, the sets of mol ratios of the vertices of said areas being as follows:

| | x | y | z |
|---|---|---|---|
| A | 0.01 | 0.60 | 0.39 |
| B | 0.01 | 0.09 | 0.90 |
| C | 0.05 | 0.05 | 0.90 |
| D | 0.10 | 0.05 | 0.85 |
| E | 0.30 | 0.15 | 0.55 |
| F | 0.30 | 0.35 | 0.35 |
| G | 0.05 | 0.60 | 0.35 |
| H | 0.01 | 0.55 | 0.44 |
| I | 0.01 | 0.09 | 0.90 |
| J | 0.05 | 0.05 | 0.90 |
| K | 0.20 | 0.05 | 0.75 |
| L | 0.20 | 0.40 | 0.40 |
| M | 0.05 | 0.55 | 0.40 |

2. The piezoelectric ceramic material of claim 1, wherein the composition is represented by the formula:

$$[Pb(Mn_{1/2}Nb_{1/2})O_3]_x[PbTiO_3]_y[PbZrO_3]_z$$

where $x$, $y$ and $z$ represent a set of mol ratios and $$x+y+z=1.00$$

and which falls within the area A-B-C-D-E-F-G of FIG. 1 of the drawing, the sets of mol ratios of the vertices of said area being as follows:

| | x | y | z |
|---|---|---|---|
| A | 0.01 | 0.60 | 0.39 |
| B | 0.01 | 0.09 | 0.90 |
| C | 0.05 | 0.05 | 0.90 |
| D | 0.10 | 0.05 | 0.85 |
| E | 0.30 | 0.15 | 0.55 |
| F | 0.30 | 0.35 | 0.35 |
| G | 0.05 | 0.60 | 0.35 |

3. The piezoelectric ceramic material of claim 1, wherein the composition is represented by the formula: $[Pb(Mn_{1/2}Sb_{1/2})O_3]_x[PbTiO_3]_y[PbZrO_3]_z$, where $x$, $y$ and $z$ represent a set of mol ratios and $x+y+z=1.00$, and which falls within the area H-I-J-K-L-M of FIG. 4 of the drawing, the sets of mol ratios of the vertices of said area being as follows:

| | x | y | z |
|---|---|---|---|
| H | 0.01 | 0.55 | 0.44 |
| I | 0.01 | 0.09 | 0.90 |
| J | 0.05 | 0.05 | 0.90 |
| K | 0.20 | 0.05 | 0.75 |
| L | 0.20 | 0.40 | 0.40 |
| M | 0.05 | 0.55 | 0.40 |

References Cited

UNITED STATES PATENTS 3,268,783 8/1966 Saburi ---------------- 106—39

3,403,103 9/1968 Ouchi et al. --------- 252—62.9

ROBERT D. EDMONDS, Primary Examiner

J. COOPER, Assistant Examiner

U.S. Cl. X.R.

106—39